(12) United States Patent
Day et al.

(10) Patent No.: US 7,877,377 B2
(45) Date of Patent: Jan. 25, 2011

(54) DROPPING TAUTOLOGICAL PREDICATES FROM SQL QUERIES FOR REUSABILITY

(75) Inventors: Paul Reuben Day, Rochester, MN (US); Brian Robert Muras, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1652 days.

(21) Appl. No.: 10/860,403

(22) Filed: Jun. 3, 2004

(65) Prior Publication Data

US 2006/0004696 A1    Jan. 5, 2006

(51) Int. Cl.
*G06F 17/20* (2006.01)
*G06F 15/16* (2006.01)

(52) U.S. Cl. ........................... 707/718; 707/719
(58) Field of Classification Search .................. None
See application file for complete search history.

(56) References Cited

U.S. PATENT DOCUMENTS

| | | | | |
|---|---|---|---|---|
| 5,548,755 A * | 8/1996 | Leung et al. | ........... | 707/2 |
| 6,275,818 B1 * | 8/2001 | Subramanian et al. | ........ | 707/2 |
| 6,466,931 B1 * | 10/2002 | Attaluri et al. | ........... | 707/2 |
| 2002/0143754 A1 * | 10/2002 | Paulley et al. | ........... | 707/3 |
| 2005/0097078 A1 * | 5/2005 | Lohman et al. | ........... | 707/2 |

* cited by examiner

*Primary Examiner*—John E Breene
*Assistant Examiner*—Alex Gofman
(74) *Attorney, Agent, or Firm*—Martin & Associates, LLC; Derek P. Martin (57) ABSTRACT

A database query optimizer creates a main access plan for a query, and also creates one or more subplans for the same query. The subplans are used in executing a query. When a subplan is generated, all tautological predicates (i.e., predicates that do not narrow the query) are dropped, thereby enhancing the reusability of stored subplans. When a query is processed, its tautological predicates are dropped, and if a subplan for the query with the dropped tautological predicates is found, the subplan is used to execute the query. If the query to be run has no main access plan in the cache, a main access plan is generated, and a subplan is also generated that corresponds to the query to be run, with all tautological predicates dropped. The same query may thus generate many subplans, enhancing the reusability of the query by storing each subplan in the access plan cache.

12 Claims, 7 Drawing Sheets

FIG. 1

Select * from FileX
where CustID LIKE '%' and
SocialSecNum LIKE '%' and
AccountNumber LIKE '%' and
Lastname LIKE '%' and
Firstname LIKE '%' and
PhoneNumber LIKE '%' and
NumericFld between 00000000 and 99999999 and
CharFld between '        ' and 'ZZZZZZZZ'

FIG. 2        Prior Art

Select * from FileX
where CustID LIKE '123456' and
SocialSecNum LIKE '%' and
AccountNumber LIKE '%' and
Lastname LIKE '%' and
Firstname LIKE '%' and
PhoneNumber LIKE '%' and
NumericFld between 00000000 and 99999999 and
CharFld between '        ' and 'ZZZZZZZZ'

FIG. 3        Prior Art

SQL Access Plan Cache 420

AP1 410

Select * from FileX
where CustID LIKE :hv1 and
SocialSecNum LIKE :hv2 and
AccountNumber LIKE :hv3 and
Lastname LIKE :hv4 and
Firstname LIKE :hv5 and
PhoneNumber LIKE :hv6 and
NumericFld between 00000000 and 99999999 and
CharFld between '        ' and 'ZZZZZZZZ'

FIG. 4          Prior Art

Select * from FileX
where CustID LIKE '%' and
SocialSecNum LIKE '%' and
AccountNumber LIKE '%' and
Lastname LIKE 'Day' and
Firstname LIKE '%' and
PhoneNumber LIKE '%' and
NumericFld between 00000000 and 99999999 and
CharFld between '        ' and 'ZZZZZZZZ'

DROPPING TAUTOLOGICAL PREDICATES FROM SQL QUERIES FOR REUSABILITY

BACKGROUND OF THE INVENTION

1. Technical Field

This invention generally relates to computer systems, and more specifically relates to apparatus and methods for optimizing a database query.

2. Background Art

Since the dawn of the computer age, computers have evolved and become more and more powerful. In our present day, computers have become indispensable in many fields of human endeavor including engineering design, machine and process control, information storage and retrieval, and office computing. One of the primary uses of computers is for information storage and retrieval.

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

Retrieval of information from a database is typically done using queries. A query usually specifies conditions that apply to one or more columns of the database, and may specify relatively complex logical operations on multiple columns. The database is searched for records that satisfy the query, and those records are returned as the query result.

Queries that are frequently run may be optimized to enhance system performance. One known way to optimize a query is to build an access plan the first time a query is run, then reuse the access plan for subsequent executions of the same query.

Graphical User Interfaces (GUIs) for databases have been developed that allow a user that is not familiar with Structured Query Language (SQL) to execute queries on a database. The GUI typically allows the user to specify values for columns in the database. Under the covers, the user-specified values are typically plugged into an SQL query, which is then executed to perform the user's query.

A very common coding practice for GUIs is to specify one large SQL query that contains predicates for all columns in all database tables referenced in the query. When a user specifies values in the GUI, these values are then plugged into the large SQL query. Any fields that the user leaves blank in the GUI will pass the wildcard, or some values that select every possible record. While this is a convenient and easy way to code a database GUI, it creates undue performance penalties in many cases because only one access plan is saved for the query, even though the query may take many different forms. The result is that the stored access plan may not be efficient to execute some variations of the query, resulting in performance penalties. Without a way to optimize a query in a way that does not create the performance penalties known in the art, the database industry will continue to suffer from undue performance penalties by reusing a single access plan for all variations of a query.

DISCLOSURE OF INVENTION

According to the preferred embodiments, a database query optimizer creates a main access plan for a query, and also creates one or more subplans for the same query. The subplans are used in executing a query. When a subplan is generated, all tautological predicates (i.e., predicates that do not narrow the query) are dropped, thereby enhancing the reusability of stored subplans. When a query is processed, its tautological predicates are dropped, and if a subplan for the query with the dropped tautological predicates is found, the subplan is used to execute the query. If the query to be run has no main access plan in the cache, a main access plan is generated, and a subplan is also generated that corresponds to the query to be run, with all tautological predicates dropped. In this manner, the same query may generate many subplans, enhancing the reusability of the query by storing each subplan in the access plan cache.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

1.0 Overview

The present invention relates to optimizing database queries. For those not familiar with databases or queries, this Overview section will provide background information that will help to understand the present invention.

Known Databases and Database Queries

There are many different types of databases known in the art. The most common is known as a relational database (RDB), which organizes data in tables that have rows that represent individual entries or records in the database, and columns that define what is stored in each entry or record.

To be useful, the data stored in databases must be able to be efficiently retrieved. The most common way to retrieve data from a database is to generate a database query. A database query is an expression that is evaluated by a database manager. The expression may contain one or more predicate expressions that are used to retrieve data from a database. For example, lets assume there is a database for a company that includes a table of employees, with columns in the table that represent the employee's name, address, phone number, gender, and salary. With data stored in this format, a query could be formulated that would retrieve the records for all female employees that have a salary greater than $40,000. Similarly, a query could be formulated that would retrieve the records for all employees that have a particular area code or telephone prefix.

Figure 2:
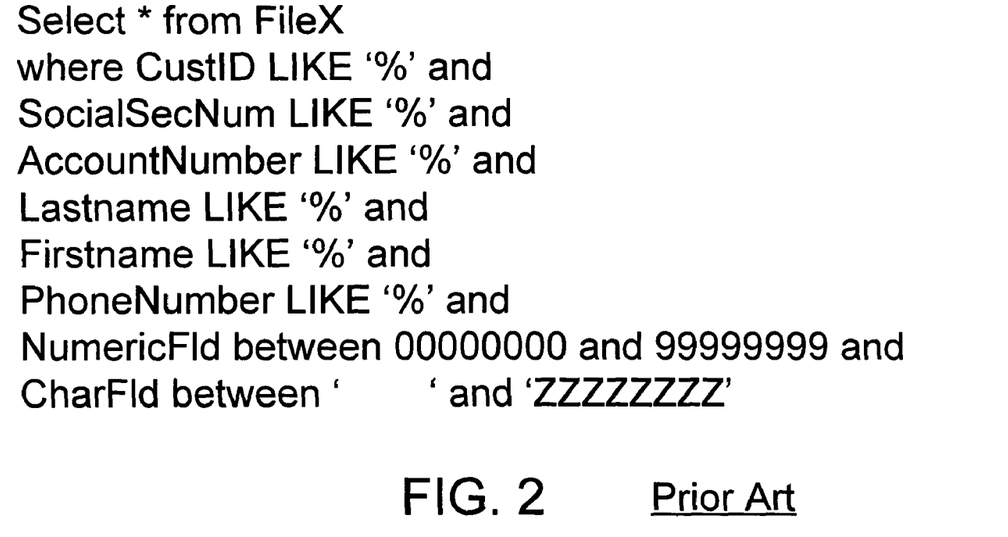
FIG. 2 shows a sample prior art database query in Structured Query Language (SQL)

One popular way to define a query uses Structured Query Language (SQL). SQL defines a syntax for generating and processing queries that is independent of the actual structure and format of the database. One sample SQL query is shown in FIG. 2. The "select *" statement tells the database query processor to select all values, the "from FileX" statement identifies which database table to search, and the "where" clause specifies several expressions (or predicates) that must be satisfied for a record to be included in the resulting dataset. Note that the query of FIG. 2 is expressed in terms of columns CustID, SocialSecNum, AccountNumber, Lastname, Firstname, and PhoneNumber, which are columns defined on the database table FileX. Information about the internal storage of the data is not required as long as the query is written in terms of expressions that relate to values in columns from tables.

As stated in the Background Art section above, it is a common coding practice for applications or GUIs that access a database to provide a single, large query that includes predicates that correspond to all columns in the database table. FIG. 2 represents such a query, with each column having a wildcard "%" that returns all values for that column. Now we assume that a user enters the value of 123456 into a GUI as the desired value of the CustID field. This value is plugged into the query in FIG. 2 to generate therefrom the query in FIG. 3. Note that the query in FIG. 3 includes all of the wildcard values for all of the columns except the CustID column, which contains the value 123456 that was plugged in from the GUI or application.

Figure 3:
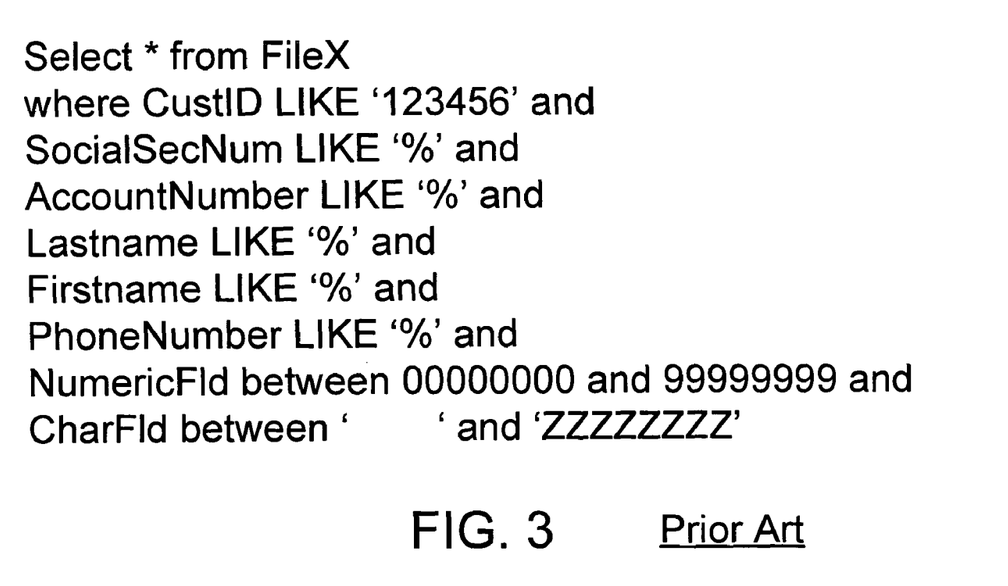
FIG. 3 shows the prior art query in FIG. 2 with a value plugged into the CustID field in the query.
Figure 4:
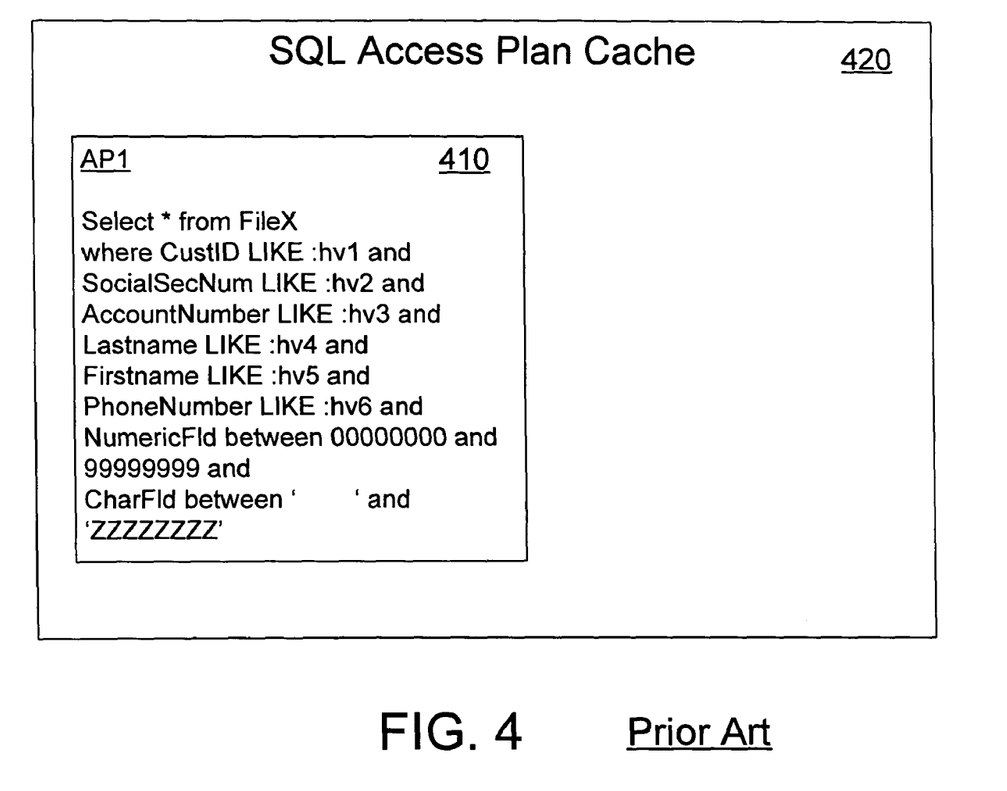
FIG. 4 is a block diagram of a prior art SQL access plan cache that contains the access plan for the query in FIG. 3.

We assume the query of FIG. 3 is then executed. The first time the query is executed, an access plan for the query is generated. A prior art access plan API 410 for the query in FIG. 3 is shown in FIG. 4. The access plan 410 does not specify values for the columns, but does include all predicates in the query, where :hv1 through :hv6 are place holders (host variables) for values to be put into the access plan at run time. In the query for this example, :hv1 will be set to 123456 and :hv2 through :hv6 will be the wildcard "%". Thus, access plan 410 is built for the query in FIG. 3, and is stored as one entry in the access plan cache 420. It is understood in the art that access plan cache 420 may contain other entries as well. Once the access plan 410 is constructed, it may be used to execute the query in FIG. 3.

Now let's assume that the user inputs a value "Day" into the Lastname field of the GUI or application. The query of FIG. 2 is modified by plugging the value of "Day" into the Lastname field, resulting in the query of FIG. 5. We now execute the query of FIG. 5 using prior art method 600 shown in FIG. 6. The query is evaluated (step 610). Method 600 determines whether an access plan exists for this query (step 620). If an access plan does not exist for the query (step 620=NO), an access plan for the query is generated (step 640), stored in the access plan cache (step 650) and used to execute the query (step 660). Because an access plan is not specific to any particular values in the predicates specified in the query, the access plan 410 in FIG. 4 is an access plan for the query in FIG. 5 (step 620=YES). The access plan 410 is then used to execute the query in FIG. 5 (step 630). This illustrates the problem with the prior art. With such a large query defined in FIG. 2 with a number of different predicates, the database manager may attempt to execute the query using an access plan that is not well-suited to executing the query. For the specific example shown in FIG. 3, we assume the query optimizer will do a full open and use an index over CustID. Note, however, that the query in FIG. 5 includes a wildcard for CustID, so the query optimizer has a performance problem. The query optimizer must do a new full open and rebuild the access plan to choose an index with Lastname as the first key for a fast query implementation, or it must reuse the access plan 410 built for the query in FIG. 3, which will perform very poorly since it is using an index over CustID and the query in FIG. 5 has no CustID value to plug into the index.

The problem is that for any permutation of filled in predicates, there is an optimal index, but very few of these permutations will share an optimal index. Thus, the query optimizer will continually have to perform full opens to ensure that it always picks the correct plan. The result is that previously-generated access plans can seldom be used. The alternative is to choose an existing plan, which may result in some permutations of filled in predicates to run fast because the index matches the selection criteria, and others to run very slowly because the selection criteria does not match.

2.0 Description of the Preferred Embodiments

The present invention avoids the problems discussed above in the prior art by generating and reusing subplans that have all tautological predicates dropped. A tautological predicate is one that returns all records when the query is executed, which means it does not narrow the query. Thus, tautological predicates may be dropped without affecting the records returned when the query is executed. The subplans are organized in the access plan cache under a single main plan, which represents a query that includes all predicates, such as the query in FIG. 2. By creating subplans that have tautological predicates dropped, the present invention avoids the overhead of rebuilding the access plan each time a permutation of the query is run, and does not suffer the performance penalties of using an access plan that is grossly inefficient.

Figure 1:
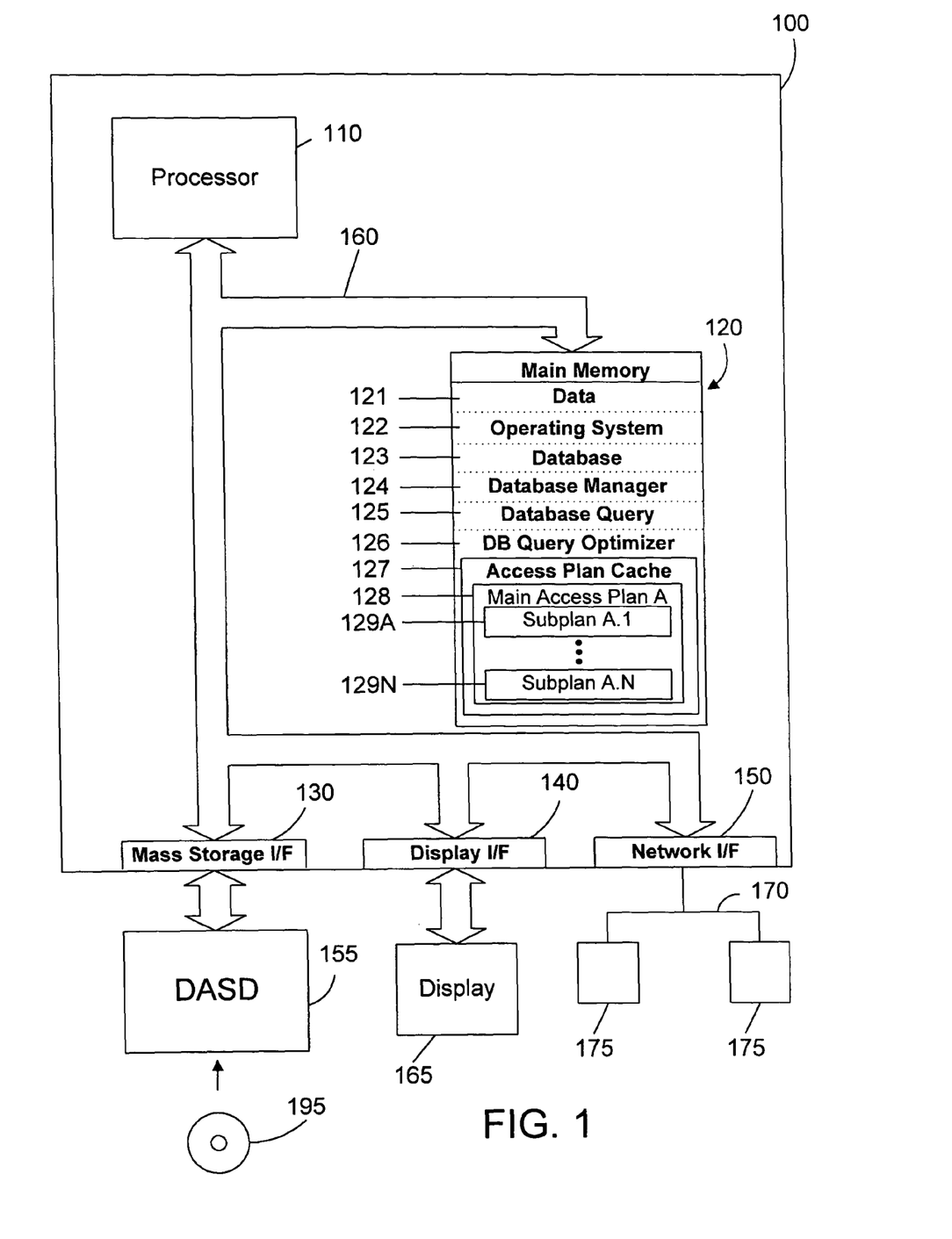
FIG. 1 is a block diagram of an apparatus in accordance with the preferred embodiments.

Referring to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD RW drive, which may store data to and read data from a CD RW 195.

Main memory 120 in accordance with the preferred embodiments contains data 121, an operating system 122, a database 123, a database manager 124, one or more database queries 125, and a database query optimizer 126. Data 121 represents any data that serves as input to or output from any program in computer system 100. Operating system 122 is a multitasking operating system known in the industry as iSeries; however, those skilled in the art will appreciate that the spirit and scope of the present invention is not limited to any one operating system. Database 123 is any suitable database, whether currently known or developed in the future. Database 123 preferably includes one or more tables. Database manager 124 provides an interface to database 123, processing queries and returning the query results. Database query 125 is a query in a format compatible with the database 123 that allows retrieval of information stored in the database 123 that satisfies the database query 125. Database query optimizer 126 processes database query 125 to optimize database query 125. Database query optimizer 126 includes an access plan cache that stores access plans in accordance with the preferred embodiments. The access plans stored in the access plan cache include one or more main access plans 128 and one or more corresponding subplans 129, shown in FIG. 1 as 129A . . . 129N. The query optimizer 126 stores access plans as subplans within the access plan cache 128. Each subplan 129 corresponds to a query with tautological predicates dropped. Each main access plan 128 corresponds to a query with all predicates. Thus, the main access plan 128 describes a genus, while subplans 129 describe species within that genus.

While database query optimizer 126 is shown in FIG. 1 to be separate from the other items in main memory 120, it is also within the scope of the preferred embodiments to include the database query optimizer 126 as part of the database manager 124, or as part of any other computer program. In addition, the access plan cache 127 may be part of the query optimizer 126, or may be separate from the query optimizer 126.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, database 123, database manager 124, database query 125, and database query optimizer 126 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD RW (e.g., 195 of FIG. 1), and transmission type media such as digital and analog communications links.

Figure 7:
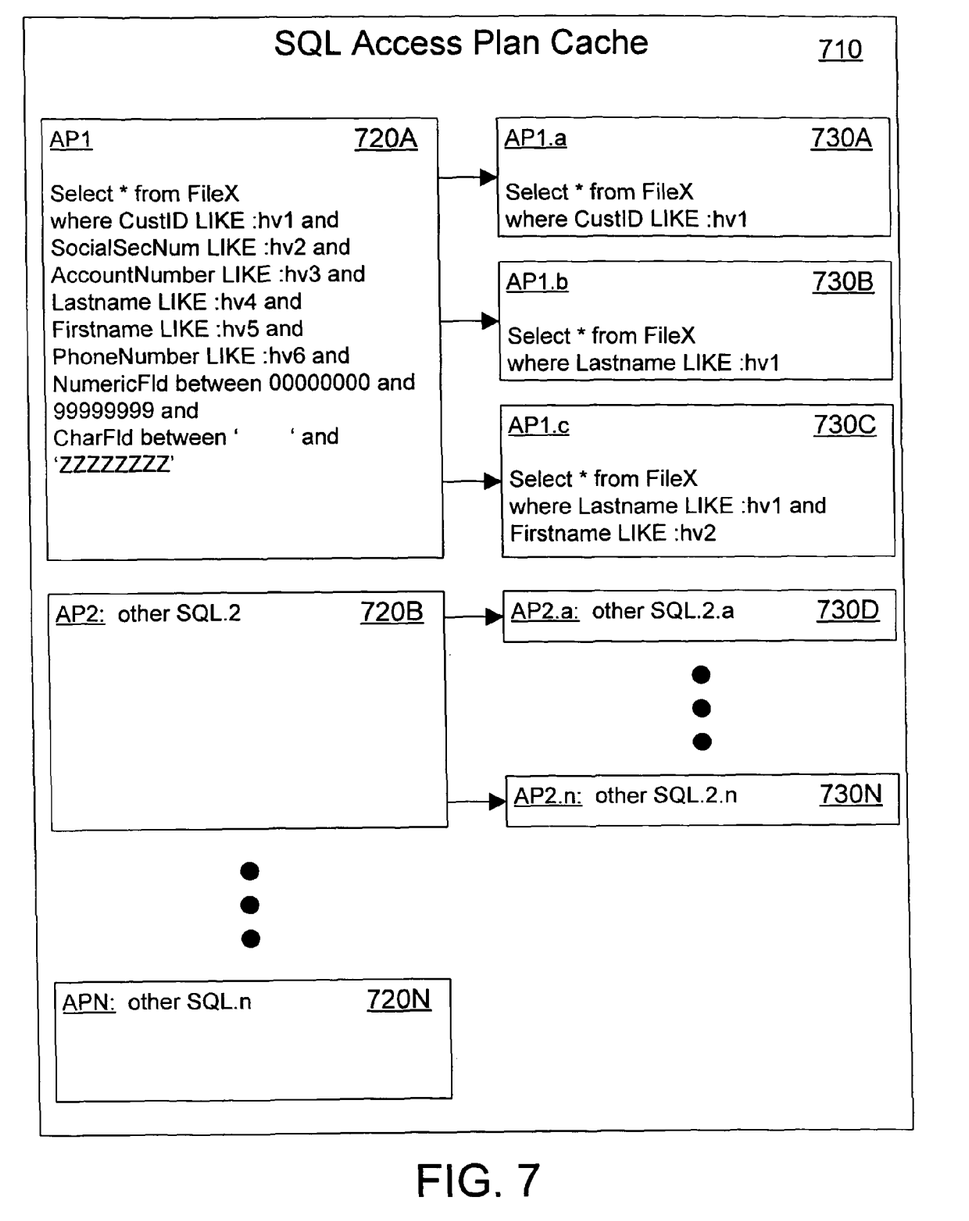
FIG. 7 is a block diagram of an SQL access plan cache in accordance with the preferred embodiments that defines one or more subplans for each main access plan, where a subplan is used to execute a query.

Referring to FIG. 7, an access plan cache 710 in accordance with the preferred embodiments comprises one or more main access plans 720, shown in FIG. 7 as 720A, 720B, . . . , 720N. Each main access plan includes one or more subplans 730. Thus, main access plan 720A in FIG. 7 includes subplans 730A, 730B and 730C. Main access plan 720B includes subplans 730D, . . . , 730N. It is understood that main access plan 720N also includes multiple subplans 730, even though none are shown in FIG. 7.

Each main access plan 720 comprises a query that includes all predicates. Each subplan 730 includes the query in the main access plan 720 with one or more tautological predicates dropped. In the scope of the preferred embodiments, a tautological predicate is one that returns all records when the query is executed. A tautology is defined as something that is always true. A tautological predicate, by definition, is always true, which means it does not narrow the query. For this reason, the tautological predicates may be dropped without affecting the records returned when the query is executed.

The present invention recognizes that tautological predicates may cause performance penalties when prior art access plans are reused (as shown and discussed with reference to FIG. 4). The present invention solves this problem by creating a hierarchy of access plans, with each main access plan comprising a query with all predicates, and each subplan comprising the same query with one or more tautological predicates dropped. By dropping tautological predicates, the preferred embodiments essentially create different versions of the query, and store the access plans for those different versions as subplans that can be individually retrieved and executed in the future.

In FIG. 7, the subplan 730A corresponds to an access plan for the query shown in FIG. 3. Referring back to FIG. 3, the CustID column in the where clause is the only column that does not have a wildcard value. This means that all of the following are tautological predicates in the query of FIG. 3: SocialSecNum, AccountNumber, Lastname, Firstname, and PhoneNumber. Because these are tautological predicates (i.e., they are always true, and therefore don't narrow the query results), they are dropped in access plan 730A, resulting in an access plan that only uses selective predicates.

Figure 5:
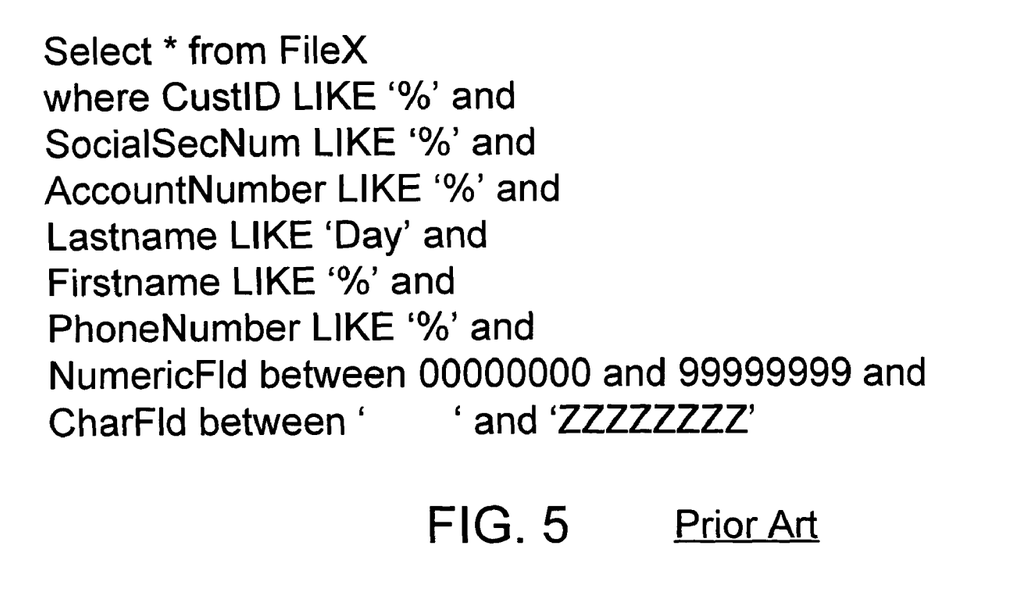
FIG. 5 shows the prior art query in FIG. 2 with a value plugged into the Lastname field in the query.
Figure 6:
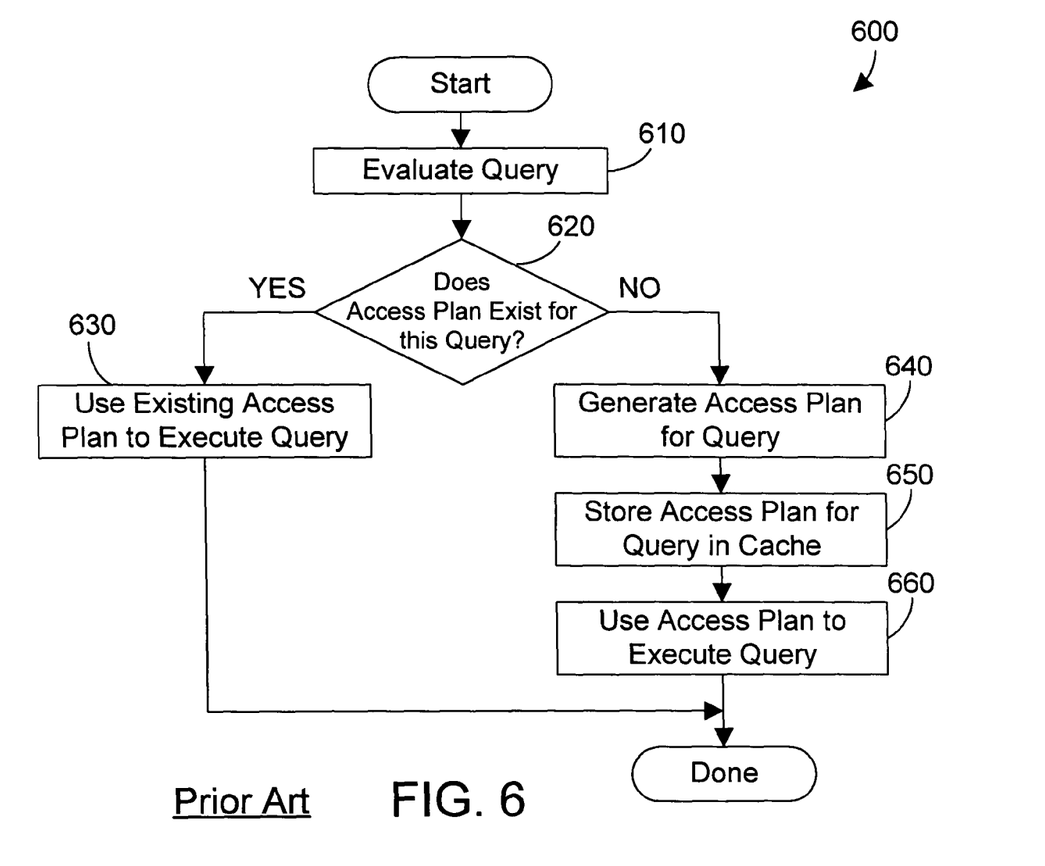
FIG. 6 is a flow diagram of a prior art method for generating, storing and reusing access plans for queries.

Subplan 730B in FIG. 7 corresponds to an access plan for the query shown in FIG. 5. In this case, the Lastname column in the where clause is the only column that does not have a wildcard value. This means that all of the other columns are tautological predicates, and are dropped when creating the subplan 730B. Subplan 730C is a subplan that has Lastname and Firstname as selective predicates, with all other predicates being tautological, and therefore dropped.

The beauty and utility of the access plan cache 710 in accordance with the preferred embodiments is that performance penalties that would normally result in coding large queries with many wildcards are avoided, because different access plans may be generated that corresponds to different versions of the same query. A main access plan represents the query with all its predicates, while the subplans represent different versions of the query that have tautological predicates dropped. This avoids using a single stored access plan for the query, which results in poor performance in many circumstances as described in detail above with respect to FIGS. 2-6.

Figure 8:
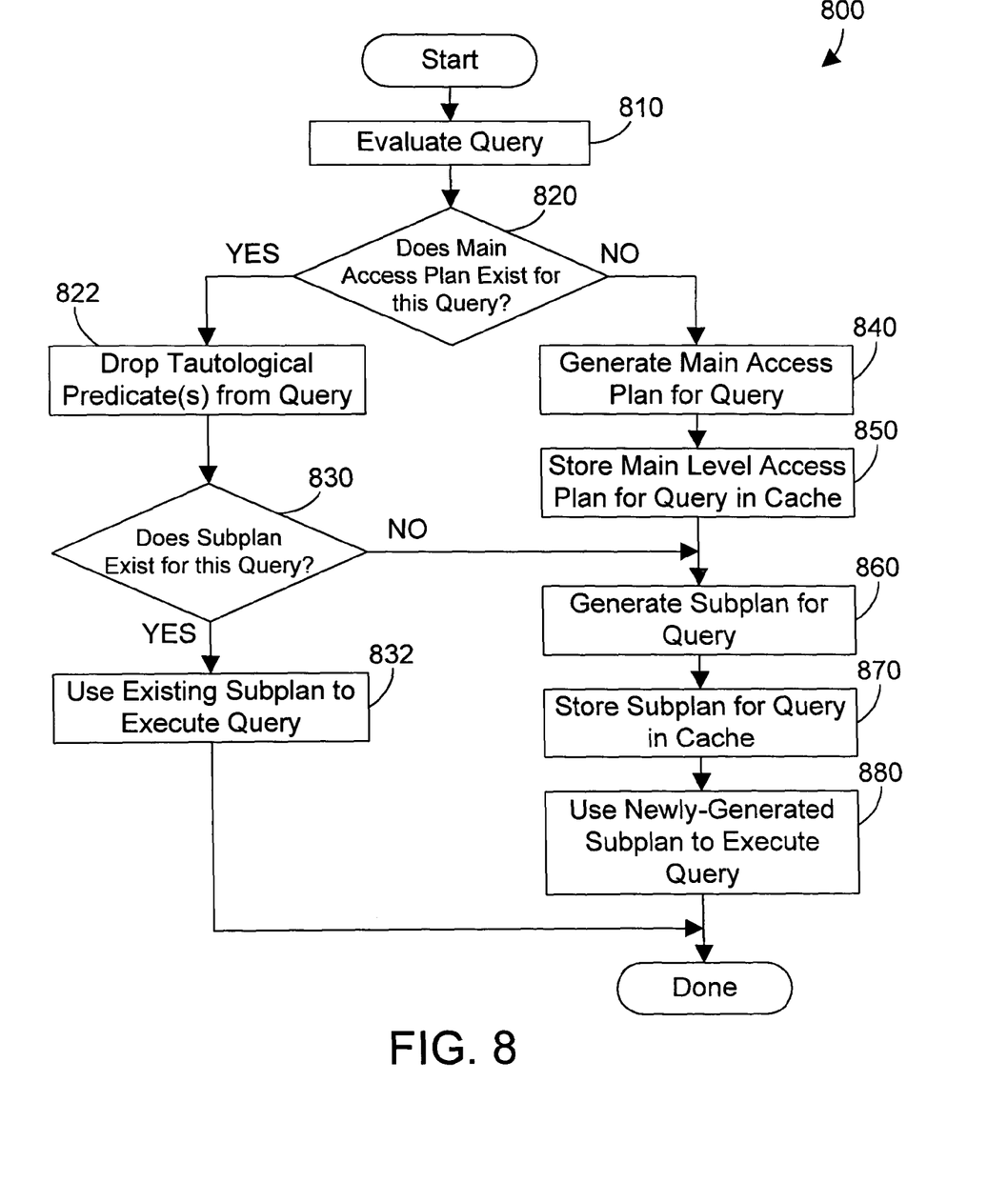
FIG. 8 is a flow diagram of a method in accordance with the preferred embodiments for generating, storing and reusing subplans that correspond to different versions of the same query.

Referring now to FIG. 8, a method 800 in accordance with the preferred embodiments is preferably performed by query optimizer 126 in FIG. 1. Method 800 begins by evaluating the query (step 810). If there is a main access plan for this query (step 820=YES), the tautological predicates are dropped from the query (step 822). If a subplan exists for the query once the tautological predicates are dropped (step 830=YES), the existing subplan is used to execute the query (step 832). If no subplan exists for this query once the tautological predicates are dropped (step 830=NO), a subplan for the query is generated (step 860), stored in the access plan cache (step 870), and used to execute the query (step 880). If no main access plan exists for this query (step 820=NO), a main access plan is generated (step 840) and stored in the access plan cache (step 850). At this point a subplan is created for the query (step 860), which is the original query with the tautological predicates dropped. The subplan is then stored in the access plan cache (step 870), and used to execute the query (step 880).

Method 800 in FIG. 8 assumes that main access plans and subplans are generated on-the-fly as they are needed. There is an alternative within the scope of the preferred embodiments to dynamic generation of main access plans and subplans as they are needed. The query optimizer 126 of FIG. 1 may optionally include an access plan generation tool that may generate access plans before they are needed. The steps taken by the query optimizer 126 to generate access plans are shown in method 900 of FIG. 9. First, a main access plan for the query is generated (step 910). A variation of the query is then generated that includes one or more predicates that are set to values that are not tautological, along with one or more tautological predicates (step 920). All tautological predicates are then dropped from the query variation (step 930). A subplan is then generated for the query variation with dropped tautological predicates (step 940). If there are more query variations (step 950=YES), method 900 loops back to step 920 and continues. Once a subplan has been generated for each query variation (step 950=NO), method 900 is done.

Figure 9:
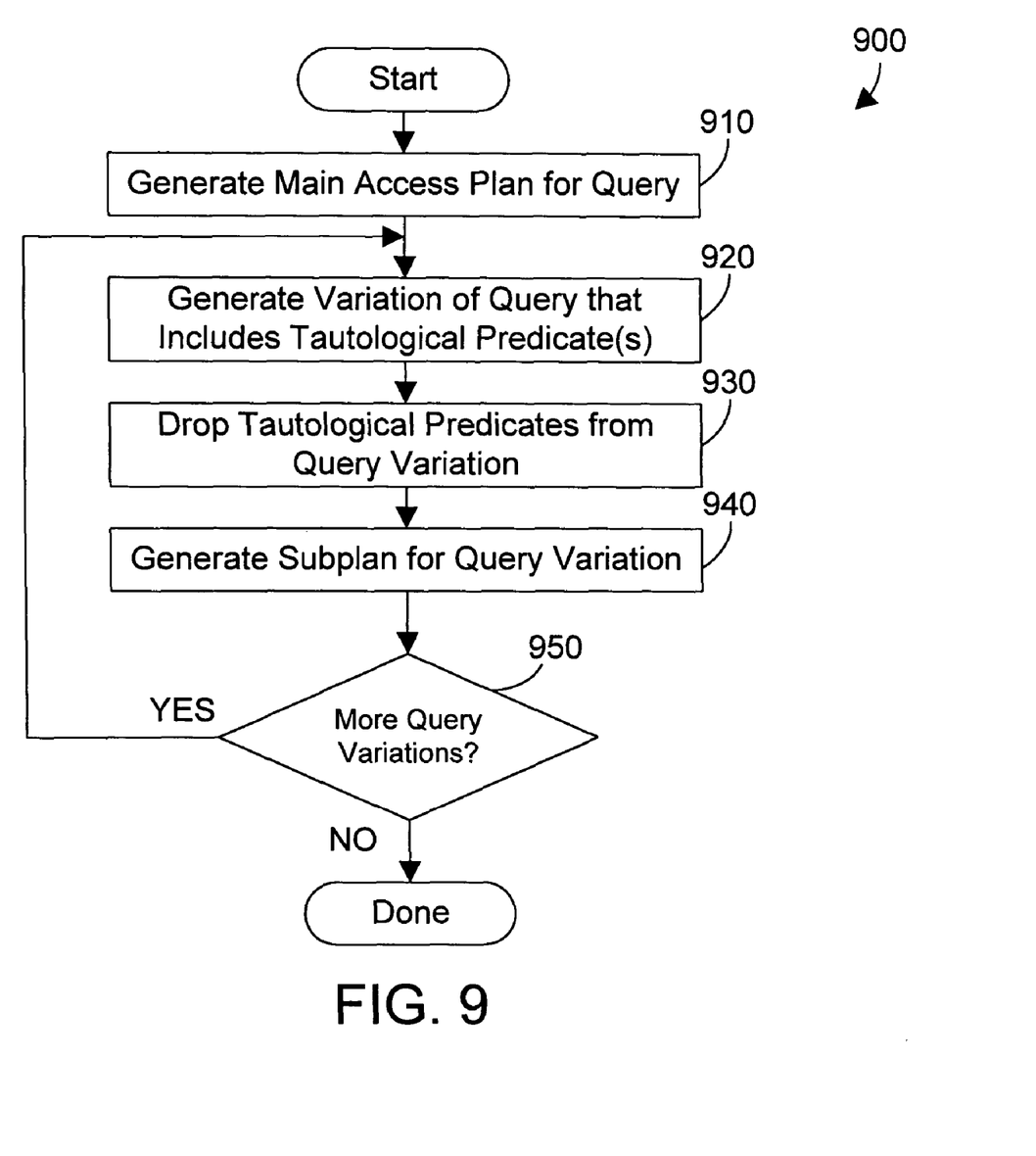
FIG. 9 is a flow diagram of a method in accordance with the preferred embodiments for automatically generating a plurality of subplans for a query.

Method 900 allows automatically generating subplans for variations of a query. The advantage of method 900 is that all possible subplans may be generated in advance and stored in the access plan cache. The result is an access plan is already built for any query variation that is run at run-time, allowing a very fast and efficient execution of any variation of a query. Of course, it takes some time to generate the execution plans for all the variations, but if this can be done off-line, such as during a calibration run, the run-time performance of processing the query will be enhanced. Method 900 can only be performed for queries that are known in advance of run-time, such as those that are coded into an application or GUI. By preprocessing query variations to generate corresponding subplans in the access plan cache, method 900 greatly enhances run-time performance of executing any variation of the query.

Note that dropping a tautological predicate may require adding an IS NOT NULL predicate if the column is null capable. This is necessary because a wildcard selects all non-null data, but still rejects rows with NULL data. Thus, a tautological predicate "where Column_Name like '%'" can be dropped as described above, and if Column_Name is null capable, the dropped tautological predicate is replaced with the predicate "where Column_Name IS NOT NULL".

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, in the most preferred implementation, all tautological predicates are preferably dropped when generating a subplan, and when evaluating a query. Note, however, that it is equally within the scope of the preferred embodiments to drop less than all of the tautological predicates, although this would likely come at the expense of decreased system performance when executing queries.

What is claimed is:
1. An apparatus comprising:
at least one processor;
a memory coupled to the at least one processor;
a database table residing in the memory;
a query residing in the memory that references the database table; and
a query optimizer residing in the memory and executed by the at least one processor, wherein the query optimizer analyzes the query, drops at least one tautological predicate from the query, and determines whether a corresponding access plan exists for the query with the at least one dropped tautological predicate, and if so, the query optimizer uses the corresponding access plan to execute the query, and if no corresponding access plan exists for the query with the at least one dropped tautological predicate, the query optimizer generates a corresponding access plan and uses the corresponding access plan to execute the query.

2. The apparatus of claim 1 wherein the query optimizer stores the generated access plan in a cache.

3. The apparatus of claim 1 further comprising an access plan cache residing in the memory, the access plan cache including:
   a main access plan, the main access plan corresponding to the query before dropping the at least one tautological predicate; and
   at least one subplan that corresponds to the main access plan, each subplan corresponding to the query after dropping at least one tautological predicate.

4. The apparatus of claim 1 further comprising an access plan generation tool residing in the memory and executed by the at least one processor, the access plan generation tool automatically generating a plurality of access plans that each correspond to the query after dropping at least one tautological predicate.

5. A method for executing a query that references a database table, the method comprising the steps of:
   (A) dropping at least one tautological predicate from the query;
   (B) determining whether a corresponding access plan exists for the query with the at least one dropped tautological predicate;
   (C) if the a corresponding access plan exists, using the corresponding access plan to execute the query; and
   (D) if no corresponding access plan exists for the query with the at least one dropped tautological predicate, generating a corresponding access plan and using the corresponding access plan to execute the query.

6. The method of claim 5 further comprising the step of: storing the corresponding access plan in a cache.

7. The method of claim 5 wherein step (B) comprises the steps of:
   determining whether a main access plan exists for the query, the main access plan corresponding to the query before dropping the at least one tautological predicate;
   determining whether at least one subplan exists for the main access plan, each subplan corresponding to the query after dropping at least one tautological predicate; and
   determining whether any subplan exists for the query with the at least one dropped tautological predicate.

8. The method of claim 5 further comprising the step of:
   automatically generating a plurality of access plans that each correspond to the query after dropping at least one tautological predicate.

9. A computer-readable program product comprising:
   (A) a query optimizer that analyzes a query, drops at least one tautological predicate from the query, and determines whether a corresponding access plan exists for the query with the at least one dropped tautological predicate, and if so, the query optimizer uses the corresponding access plan to execute the query, and if no corresponding access plan exists for the query with the at least one dropped tautological predicate, the query optimizer generates a corresponding access plan and uses the corresponding access plan to execute the query; and
   (B) recordable media bearing the query optimizer.

10. The program product of claim 9 wherein the query optimizer stores the generated access plan in a cache.

11. The program product of claim 9 further comprising an access plan cache residing on the recordable media, the access plan cache including:
   a main access plan, the main access plan corresponding to the query before dropping the at least one tautological predicate; and
   at least one subplan that corresponds to the main access plan, each subplan corresponding to the query after dropping at least one tautological predicate.

12. The program product of claim 9 further comprising an access plan generation tool residing on the recordable media, the access plan generation tool automatically generating a plurality of access plans that each correspond to the query after dropping at least one tautological predicate.

* * * * *